(12) United States Patent
Kan et al.

(10) Patent No.: US 8,775,746 B2
(45) Date of Patent: Jul. 8, 2014

(54) INFORMATION PROCESSING SYSTEM AND METHOD

(75) Inventors: Masaki Kan, Tokyo (JP); Yoshiaki Sakae, Tokyo (JP); Michitaro Miyata, Tokyo (JP); Yasuo Itabashi, Tokyo (JP); Dai Kobayashi, Tokyo (JP); Takashi Torii, Tokyo (JP)

(73) Assignee: Nec Corporation, Tokyo (JP)

( * ) Notice: Subject to any disclaimer, the term of this patent is extended or adjusted under 35 U.S.C. 154(b) by 330 days.

(21) Appl. No.: 13/254,339

(22) PCT Filed: Mar. 3, 2010

(86) PCT No.: PCT/JP2010/053450
§ 371 (c)(1),
(2), (4) Date: Sep. 1, 2011

(87) PCT Pub. No.: WO2010/101189
PCT Pub. Date: Sep. 10, 2010

(65) Prior Publication Data
US 2011/0320750 A1 Dec. 29, 2011

(30) Foreign Application Priority Data
Mar. 6, 2009 (JP) ................................ 2009-053587

(51) Int. Cl.
*G06F 12/00* (2006.01)

(52) U.S. Cl.
USPC ........................................................ 711/154

(58) Field of Classification Search
USPC ........................................................ 711/154
See application file for complete search history.

(56) References Cited

FOREIGN PATENT DOCUMENTS

| CN | 1640125 A | 7/2005 |
|---|---|---|
| JP | 2003345632 A | 12/2003 |
| JP | 2004295457 A | 10/2004 |
| JP | 2005063214 A | 3/2005 |

OTHER PUBLICATIONS

S. Ghemawat et al., "The Google File System", 19th ACM Symposium on Operating Systems Principles, Oct. 2003.
Chinese Office Action for CN Application No. 201080010870.7 issued on Oct. 10, 2013.

*Primary Examiner* — Brian Peugh
(74) *Attorney, Agent, or Firm* — Sugrue Mion, PLLC

(57) ABSTRACT

A system includes a processing history recording means that records history information of information processing performed by an information processing means on data, a plurality of information storing means that store information in mutually different information storage formats, and an information storage format control means that controls to changes an information storage format of data, on the basis of a history of information processing performed on the data.

16 Claims, 10 Drawing Sheets

FIG. 7

| INFORMATION FOR IDENTIFYING DATA | INFORMATION INDICATING TYPES OF PROCESSING PERFORMED BY INFORMATION PROCESSING MEANS 1 | | |
|---|---|---|---|
| DATA id | sort NUMBER | get NUMBER | analysis NUMBER |
| 1 | 1 | 0 | 3 |
| 2 | 0 | 3 | 0 |
| 3 | 4 | 0 | 0 |
| 4 | 1 | 0 | 6 |

FIG. 8

| INFORMATION FOR IDENTIFYING DATA | INFORMATION IDENTIFYING THE STORAGE LOCATION OF DATA | | |
|---|---|---|---|
| Id | host name | file path (information) | TYPE |
| 1 | host1 | /home/data/1.obj | plane file |
| 3 | host3 | /home/data/3.obj | plane file |
| 5 | host1 | /home/data/5.obj | plane file |
| 7 | host2 | Table A | database table |
| 2 | host1 | /home/data/2.obj | sorted file |
| 4 | host1 | /home/data/4.obj | plane file |

FIG. 9

| INFORMATION FOR IDENTIFYING DATA | INFORMATION IDENTIFYING THE STORAGE LOCATION OF DATA |
|---|---|
| META-INFORMATION (CREATION DATE) | id |
| 2008.10.1 | 1,3,5 |
| 2008.10.4 | 2,4,6 |

FIG. 10

| INFORMATION FOR IDENTIFYING DATA | INFORMATION IDENTIFYING THE STORAGE LOCATION OF DATA |
|---|---|
| File NAME | id |
| /home/hoge/testdata.dat | 1 |
| /home/hoge/secondtestdata.dat | 7 |

INFORMATION PROCESSING SYSTEM AND METHOD

TECHNICAL FIELD

Reference to Related Application

This application is based upon and claims the benefit of the priority of Japanese patent application No. 2009-053587 filed on Mar. 6, 2009, the disclosure of which is incorporated herein in its entirety by reference thereto.

The present invention relates to an information processing technology, and particularly to a system and method changing an information storage format.

BACKGROUND

The amount of information to be processed has continued to increase in recent years, and hence there are increasing demands for a system to store the information and for a system to perform processing by utilizing the stored information.

Definition of Meta-Information

The information (data) stored in such a system can be divided into two classes.

A main body of information (data), and information (data) about the information (data), i.e., meta-information (metadata).

General examples of meta-information are as follows.

Name of an author and creation date and time of an office document,

Bibliographic information in a library, and the like.

In a file system software, an example of an information storage system, the following can be examples of meta-information.

A file path indicating where a file is, and

User who is an owner of a file, and access time

In addition to these general examples, the present document will treat information extracted or created from the main body of information or obtained by processing the information as meta-information. As an example of such information obtained from the main body of information, there is index information (index word extracted from a document, location and place of their occurrences, and score information calculated from other items of information) in an information retrieval system.

Information required for managing data in a system storing information is treated as meta-information since it is the information about information.

For instance, in a file system, the following can be examples of meta-information.

Information indicating where a file is stored, and

Information for access control

As described, these items of meta-information are not only used and referred to by a user, but also utilized by an information storage system.

Therefore, for a reason such as maintaining the performance, meta-information is often managed and stored using a method different from that for the main body of information.

As an example of a conventional information system, Patent Document 1 relates to a parallel computing system in which a plurality of processors including a recording medium and a CPU are connected via a network and they execute parallel processing while operating in conjunction with each other, and particularly to a data management system managing a plurality of data files stored in each recording medium of the plurality of processors. This server device enables a user or program to access the data file stored in each processor by generating and holding a management file including path information for each of the plurality of data files stored in the plurality of processors.

Similarly, a management server storing location of a chunk from a file name as metadata is prepared in a technology described in Non-Patent Document 1. Non-Patent Document 1 discloses a configuration in which metadata is stored in a semiconductor memory for high-speed operation.

Generally speaking, since a semiconductor memory has a smaller capacity than a storage device such as a magnetic disk, information stored as metadata is restricted to limited meta-information such as directory tree information of file and location of chunk.

Patent Document 1

Japanese Patent Kokai Publication No. JP-P2005-63214A

Non-Patent Document 1

Sanjay Ghemawat, Howard Gobioff, and Shun-Tak Leung, "The Google File System," $19^{th}$ ACM Symposium on Operating Systems Principles, Lake George, N.Y., October, 2003.

SUMMARY

An analysis below is given by the present invention.

An analysis on the related technologies by the present invention will be given below.

Information managed by a metadata management server is determined when the system of the server is designed. As a result, utilization of meta-information is restricted to ones which are took into consideration at the time of system design.

In the information systems described in Patent Document 1 and Non-Patent Document 1, in order to access information within a file, one must access a management file (or management server), find out the location where the actual file information is stored, and then access the actual file information.

However, processing that does not always require access to the entire actual file information may occur when the system is being used. For instance, let's think about a case where the size of any given file is investigated.

By designing a system in such a manner that the size of each file is recorded as meta-information, one can investigate the size of any file by accessing the meta-information.

However, a system designed with an assumption that such processing (investigation of file size) is unlikely to occur does not manage file size as meta-information. Therefore, if one wants to investigate the size of a file in such a system, he must access the actual file and investigate the size thereof.

As described above, in a case where the format in which information is stored is determined at the time of system design, the information storage format may not be suitable for ways in which the information is actually utilized.

Therefore, it is an object of the present invention to provide information processing system and method capable of changing an information storage format to a format suitable for the data utilization form.

According to the present invention, there is provided a system comprising:

an information storing means that is capable of supporting a plurality of mutually different information storage formats and stores data in an information storage format corresponding to the data;

a processing history recording means that records a history of information processing on data; and an information storage format control means that controls an information storage format of the data based on processing history information recorded in the processing history recording means.

According to the present invention, there is provided a method comprising:

an information storing means capable of supporting a plurality of mutually different information storage formats storing data in an information storage format corresponding to the data; recording a history of information processing on data in a processing history recording means; and changing an information storage format of the data based on processing history information recorded in the processing history recording means.

According to the present invention, there is provided a program causing a computer to execute the processing comprising:

an information storing means capable of supporting a plurality of mutually different information storage formats storing data in an information storage format corresponding to the data;

recording a history of information processing on data in processing history recording means; and changing an information storage format of the data based on the processing history information recorded in the processing history recording means.

According to the present invention, an information storage format can be changed to a format suited to the data utilization form.

BRIEF DESCRIPTION OF THE DRAWINGS

FIG. 7 is a diagram showing an example of processing history recordation contents in the first exemplary embodiment of the present invention.

FIG. 8 is a diagram showing an example of the contents of an information storage format storage unit in the first exemplary embodiment of the present invention.

FIG. 9 is a diagram showing an example of the contents of the information storage format storage unit in the first exemplary embodiment of the present invention.

FIG. 10 is a diagram showing an example of the contents of the information storage format storage unit in the first exemplary embodiment of the present invention.

PREFERRED MODES

Figure 1:
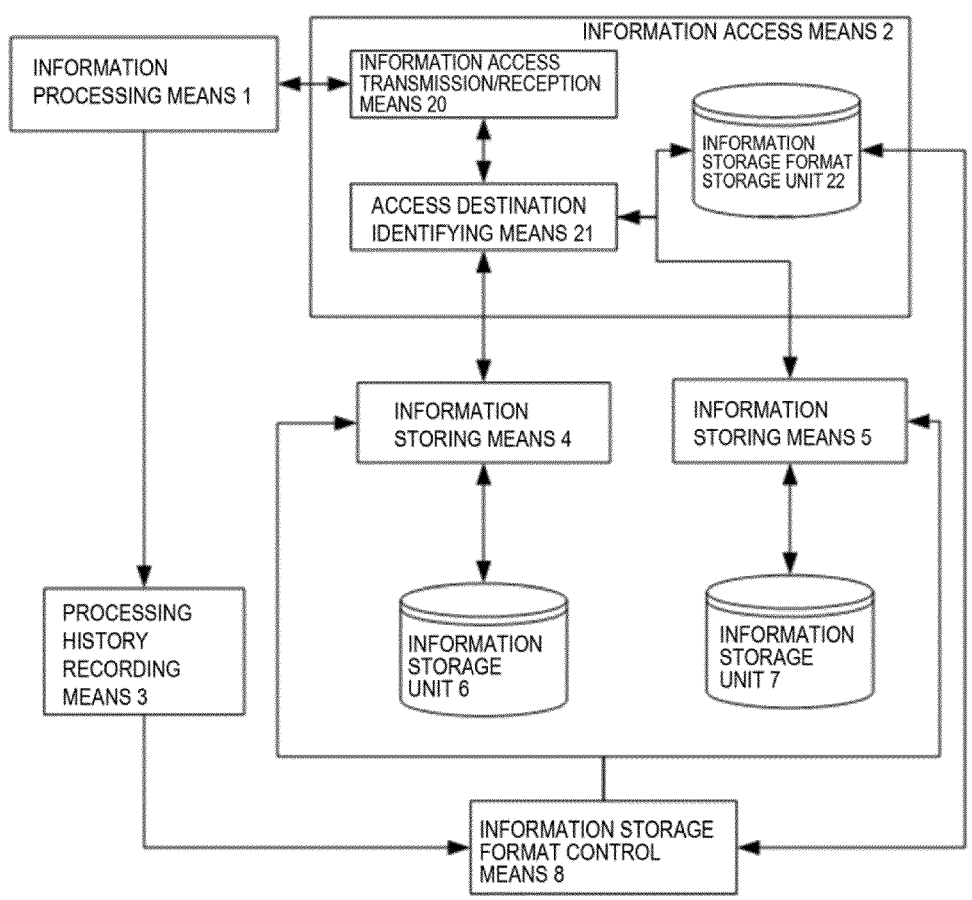
FIG. 1 is a diagram illustrating the configuration of a first exemplary embodiment of the present invention.

Exemplary embodiments of the present invention will be described. First, an information storage format treated in the present application will be explained. It should be noted that the information storage format described below is for facilitating the understanding of examples described later and does not limit the present invention.

An information storage format includes at least one or a combination of the following: a recording medium for storing data (for instance, a magnetic disk (HDD), semiconductor memory, SSD (solid-state disk), and so forth), a storage format, a procedure for storing data, and software. Examples of software includes a file system, a database, and a search engine. Information storage formats are different each other when they differ in at least one of the above items. For instance, an information storage format in a case where data is held in a database and an information storage format in a case where data is held in a file, are different each other.

Below, an example of a document file for an office use will be described. For instance, as a method for holding the data of this document file, there are the following formats, though not limited thereto.

(A1) Binary file for an application handling a document, represented by Microsoft Word (registered trademark).

(A2) Text file obtained by extracting strings from a document.

(A3) Text file in HTML format and XML format both holding structural information as well.

(A4) Database record (for instance, each meta-information is stored in each field of the database, and document content data is stored in a field in BLOB (Binary Large OBject) format).

(A5) Index of a search engine.

For instance, strings in a document are divided by word, and the number of occurrences and locations of occurrences for each word in the document are stored in an inverted file format of a search engine.

These are examples of information storage formats, and storing any part of the same information or equivalent in a format different from an original one is referred to as "conversion of information storage format." Another example listed below includes data constituted by a combination of a plurality of data such as structure in C language.

Parameter1 int[]={1,2,3,4,5,3,6,23,10}
Parameter2 string="name"
Parameter3 int=8;
Parameter4 int=1;
Parameter5 int=3;

(where "int" denotes an integer type and "string" a character string.)

There are several methods in which plural items of data mentioned above are held as one item of data. For instance, there are the following methods, though not being limited thereto.

(B1) Numerical values are stored in a predetermined format (for instance, a file in which a content such as "12345362310name813" is recorded).

(B2) Stored in a format in which a first array is sorted in advance (for instance, a file in which a content such as "23106543321name813" is recorded).

(B3) A numerical value obtained by summing a first array is recorded therewith (for instance, 57, 12345362310name813).

(B4) Recorded as a record of a database. For instance, recorded as one whole record, which is divided into fields of Parameters 1 to 5. Or by holding each array element in Parameter 1 as a different record and storing other fields as described above, total nine records are stored.

(B5) Only some data is stored in a different format. For instance, only Parameter 2 is stored in a database, and other items of data are stored in one of the file formats described above.

The reason why various variations exist as described above is that an appropriate storage mode depends on how the data is utilized.

For instance, a total value is required more often than not when a first array is accessed, the third format (B3) is more efficient than the first format (B1).

When a plurality of items of data are referred to and processing is performed on data with a value greater than five in Parameter 3 and a value smaller than two in Parameter 4, it is more efficient to store data as a record of a database.

When processing is performed on data with a string in Parameter 2 satisfying a condition, a format in which only Parameter 2 is held in a database and the storage locations of other items of data are stored therewith may be more appropriate.

Therefore, in the present invention, Parameter 2 is stored in an information storage format storage unit (22) and other items of data are stored in an information storage unit (6) in an exemplary embodiment (a second exemplary embodiment) described later.

According to the present invention, there is provided an efficient system that converts a data storage format to an appropriate format out of various methods in accordance with data utilization mode of an application. If how data will be utilized is known at the time of system design, providing an efficient system is relatively easy. In a case where how data will be utilized is unknown at the time of system design or the utilization form is changed after the system has been designed, the information storage format is often not suitable for an actual utilization mode.

Therefore, in the present invention, there is provided a system capable of coping with a case where the way data is utilized is unknown at the time of system design and a case where utilization mode has changed from that at the time of the system design.

<Exemplary Embodiment 1>

FIG. 1 is a diagram illustrating the configuration of a first exemplary embodiment of the present invention. With reference to FIG. 1, a system of the first exemplary embodiment of the present invention comprises: an information processing means 1, an information access means 2, a processing history recording means 3, information storing means 4 to 5, information storage units 6 and 7, and an information storage format control means 8. FIG. 1 has a configuration comprising two information storing means (4 and 5) and two information storage units (6 and 7), however, the numbers of the information storing means and the information storage units are not limited to two and may be any number.

The information processing means 1 includes a software (a program) realizing processing performed using data (information) stored in the information storage units 6 and 7 or processing that stores processing results in the information storage units 6 and 7. More specifically, the information processing means 1 is an environment that executes a logic (source code) written in a programming language. The information processing means 1 can be an execution binary operating on an OS (Operating System) as long as it can record the history of processing performed on information in the processing history recording means 3, or an execution binary may be generated in the information processing means 1 by compiling a source code.

When a source code is complied by the information processing means 1 (or therebefore), the source code may be converted so as to have a function of recording history in the processing history recording means 3.

The information access means 2, which comprise an information access transmission/reception means 20, an access destination identifying means 21, and an information storage format storage unit 22, provides functions of reading from and writing to the information storage units 6 and 7 by the information processing means 1.

The information access transmission/reception means 20 receives an access request from the information processing means 1 to optional information (data) and responds a result.

The access destination identifying means 21 determines where in the information storage units 6 and 7 the data (information) specified by the information processing means 1 is stored, and issues an access request to the information storing means corresponding to a storage target.

Information (meta-information) which the access destination identifying means 21 uses to determine whether or not, or where in the information storage units 6 and 7, the data (information) specified by the information processing means 1 is stored and held in the information storage format storage unit 22.

In the information storage format storage unit 22, there is stored information (meta-information) regarding which information storage unit stores a single item of data (information) or a plurality of items of data (data group/information group).

For instance, the information storage format storage unit 22 is constituted as a meta-server in a distributed file system and is implemented by a memory device and software which causes the memory device to function as the server. More specifically, the information storage format storage unit 22 is implemented by a data management system described in Non-Patent Document 1. The software realizing the information storage format storage unit 22 may be implemented by any technique. Database software or search engine software is employed in the present exemplary embodiment, since high-speed search performance and response performance are required. A magnetic disk device, a semiconductor memory device and the like is used as an storage device of the information storage format storage unit 22.

The processing history recording means 3 records a log of access to information carried out by the information processing means 1.

The processing history recording means 3 may hold the log of access by
  in a log file format in which a sequential additional write to a file is preformed, or
  as a database in any format.

The processing history recording means 3 records at least
  information for identifying the information accessed by the information processing means 1 (for instance, information such as an unique ID of data and file path lends itself to this), and
  contents (types) of processing performed on the information.

Examples of the contents (types) of processing performed on the information are:
  information indicating that processing is similar to a read operation
  information indicating that processing is similar to a write operation
  information indicating a name of a function (a name of a method) called in a program, and
  information indicating an access characteristic (for instance, random access, sequential access, newly created, and update processing, etc.).

The processing history recording means 3 may simply record the fact that access has been made. Any of the information described above is stored in the processing history recording means 3.

The information stored in the processing history recording means 3 may be erased (or deleted) at some point. For instance, older information may be erased when the information exceeds a predetermined size, or when processing changing an information format (described later) has been performed on information, the history of this information may be erased.

The information storing means 4 and 5 each includes a software that reads from and writes to the information storage units 6 and 7, respectively. The information storing means 4 and 5 read/write information from/to the information storage units 6 and 7 using different techniques.

For instance, as a specific example, the information storing means 4 includes a file system software, and the information storing means 4 includes a database software.

The information storing means 4 and 5 may include a software implementing functions of reading/writing information using a file system software or a database software. Each of the information storing means 4 and 5 may independently comprise a plurality of information storage modes for any information. For instance, in a case of a database software, the same information is stored using different schemas. In a case of a file system, information is stored as a binary file for the office document application, or it is stored as a text file by extracting a text part. The storage order inside the text file may be changed (for instance, sorted by a first string).

Storing a plurality of items of information in a signal file or database table and storing each item of information as a different file or database table correspond to using different information storage formats for different purposes in the present invention.

The information storage units 6 and 7 operate as actual storage units of information. Any number of devices comprising any memory element, such as a magnetic storage device are used as the information storage units 6 and 7. More specifically, a file server which comprises a disk array device and an arithmetic logic unit and in which a file system operates, or a storage device utilizing a semiconductor memory are used as the information storage units 6 and 7. The configurations of the information storing means and the information storage unit may be changed.

In the example shown in FIG. 1, the information storing means 4 is coupled with the information storage unit 6, and the information storing means 5 is coupled with the information storage unit 7, however, the present invention is not limited to this configuration. The information storage units 6 and 7 may be realized as the same device or system, and may be shared by a plurality of information storing means.

Conversely, a plurality of information storage units may be utilized by a single information storing means. The information storage format storage unit 22 and the information storage units 6 and 7 may be constituted by the same storage unit. Any information storage unit may be treated the same as the information storage format storage unit 22. In other words, information stored in the information storage format storage unit 22 may be stored in the information storage units 6 and 7. Recoded contents in the processing history recording means 3 may be stored in the information storage units 6 and 7, or the information storage format storage unit 22.

The information storage format control means 8 changes the information storage format of information using log information written in the processing history recording means 3. In other words, the information storage format control means 8 converts the information storage format so that information stored by the information storing means 4 is stored by the information storing means 5 thereafter. The information storage format control means 8 may comprise a storage means that records a condition for changing information storage format for information.

Figure 2:
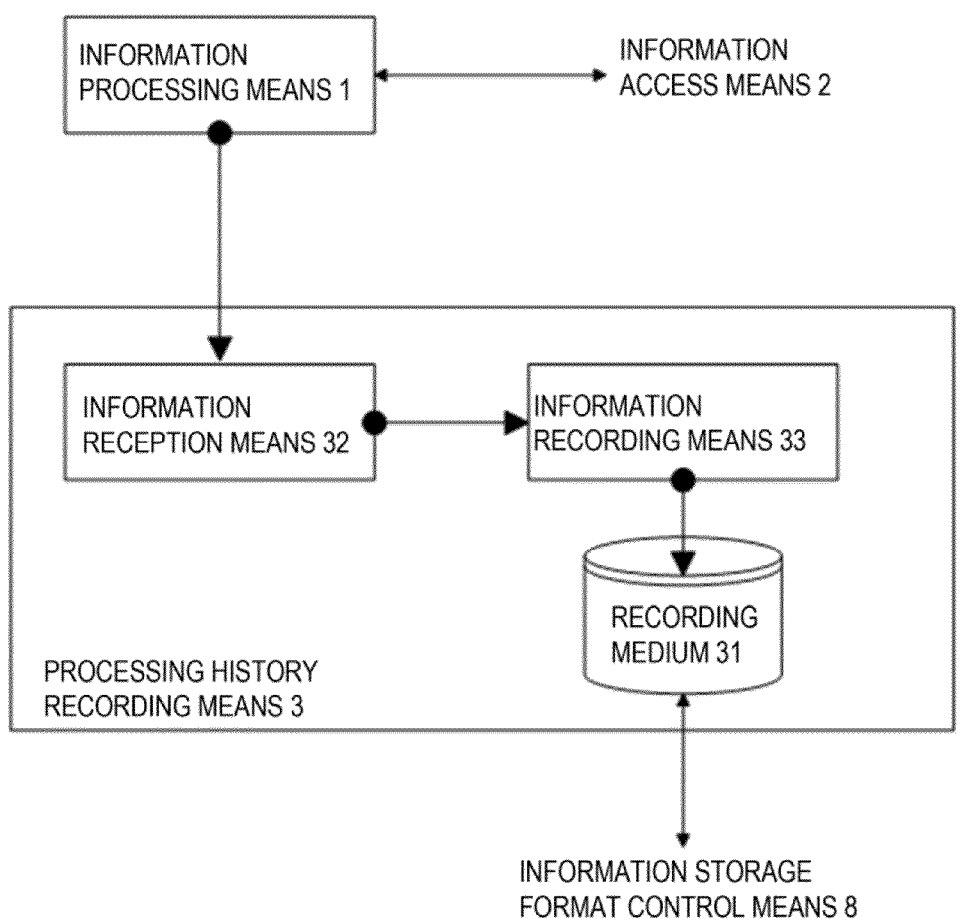
FIG. 2 is a diagram illustrating the configuration of processing history recording means in the first exemplary embodiment of the present invention.

FIG. 2 is a diagram illustrating a configuration example of the processing history recording means 3 in FIG. 1. Referring to FIG. 2, the processing history recording means 3 comprises an information reception means 32, a information recording means 33, and a recording medium 31.

The information reception means 32 receives
  type of processing performed by the information processing means 1, and
  type of information for identifying data utilized in the processing from the information processing means 1.

As described above, examples of information indicating the type of processing performed by the information processing means 1 are as follows.

(C1) Information indicating that access is to be carried out.
(C2) Information indicating that processing is similar to a read operation (Read).
(C3) Information indicating that processing is similar to a write operation (Write).
(C4) Information indicating an access characteristic (for instance,
  random access (Random-Read, Random-Write),
  sequential access (Sequential-Write, Sequential-Read),
  newly created (Create),
  update processing (Update), and the like).
(C5) Information indicating a name of a function (a name of a method) called in a program (for instance, Class#methodname, sort, join, . . . or fopen, . . . , and the like)

Using these items of information, the information storage format control means 8 determines whether or not an information storage format needs to be changed, and the type of change. As for the granularity of information to be recorded, a system embodying the present invention may set it to any level. However, sufficient accuracy should be provided for information required for a decision the information storage format control means 8 makes.

For instance, in a case where a decision regarding format change is made based on whether access is read or write, and on the number and a frequency thereof, the information examples (C2) and (C3) suffice. When information having a finer accuracy is utilized, the name in a program and the method name need to be recorded as in the example (C5).

Examples of information for identifying data utilized for processing performed by the information processing means 1 (this information is utilized by the information reception means 32) are as follows, but not limited thereto.

(D1) A file path of data (for instance, /home/user/¯¯¯.dat, etc.)
(D2) A file path of data and a host name (IP address) where the data is stored (for instance, /home/user/¯¯¯.dat, host1.abc.com, IP address: 10...**, etc.)
(D3) Data ID (ID information for identifying data: for instance, 120321).
(D4) A hash value of data (for instance, 5a579238e591f8b95569613f8cdc5b26).
(D5) Meta-information of data (for instance, Data Owner=name, date and time created=YY/MM/DD/HH/MM, etc.)

From these items of information, the information storage format control means 8 needs to be able to specify where the data is disposed (which information storage unit (the information storing means 4 or 5)).

For instance, when information for identifying data utilized for processing is "the file path of the data and a host name (IP address) where the data is stored," information stored in the processing history recording means 3 can specify where the data is disposed.

The information storage format control means 8 may identify a location where data is disposed, by inquiring the information access means 2 (making a decision by combining with information held by the information storage format storage unit 22).

For instance, in a case of "file path of data," "ID of data," and "hash value of data," if the information access means 2 comprises a function of responding a location of data based on information such as "file path of data," "ID of data," and "hash value of data," the information storage format control means 8 is able to identify the location where data is disposed, by inquiring the information access means 2. Similarly, the information storage format control means 8 may identify the location where data is disposed by inquiring "meta-information."

Alternatively, the information storage format control means 8 may independently identify the location where data is disposed. For instance, the location where data is disposed can be calculated from "hash value of data" and "ID of data" using a consistent hashing technique.

The information recording means 33 records information received by the information reception means 32 in the recording medium 31. The recording medium 31 is realized by a storage device such as a magnetic disk and a semiconductor memory. The format in which information is recorded in the recording medium 31 can be realized using any method. Though not limited thereto, for instance, the following technique is used as a log file.

A case where the processing history of data is recorded in a log file by the processing history recording means 3 will be described. For instance, the data is added to the end of a file in a log format represented by Syslog and the like, a standard specification (logging standard) for forwarding a log message to an IP network. For instance, the following format may be used ("_" indicates a space).

Date (date and time information)_server name (for instance, the name of the information processing means 1)_Read (information indicating type of processing performed by the information processing means 1)_/home/user/A.dat (information for identifying data)

Date_server name_ Read_ /home/user/A.dat
Date_server name_ Write_/home/user/B.dat
Date_server name_ Read_/home/user/B.dat This example of a log shows that the fact that Read is performed twice on a file named A.dat and that Write and Read are performed once each on B.dat. is recorded.

The information recording means 33 interprets information received by the information reception means 32, creates information in the log format, and adds the information to the end of the log file.

Next, a case where the processing history recording means 3 manages processing history of data in a database will be described. In this case, the processing history recording means 3 records information as a tabular database using a database management software (a database management software constitutes the information recording means 33 in FIG. 2).

For instance, information is recorded using a table shown in FIG. 7. FIG. 7 is a diagram showing an example of a table configuration of a database in the case where the processing history recording means 3 manages the processing history of data in a database.

The example shown in FIG. 7 shows that the fact that sort processing is performed once and analysis processing is performed three times on data having data id "1" is recorded. Similarly, it shows the fact that get (search) processing is performed three times on data having data id "2" is recorded.

The information recording means 33 interprets information received by the information reception means 32 and updates the table where necessary. A record (row) or column may be added if necessary.

An index may be created according to an access characteristic of the information storage format control means 8. For instance, in a case where the change of an information storage format is mainly determined based on the number of sorts, the table is configured so that an index is created in the column of the sort number.

Information may be held as an associative array on a memory using a hash table. For instance, information is held with id of data as a key and the number of processing executed as a value.

Information can be recorded in the recording medium 31 in one of the above formats, log file, database, and associative array, or in a plurality of these formats. For instance, a configuration using two formats, log and tabular database formats, may be used.

Alternatively, as described above, a compiler type may be employed. In this case, the information processing means 1 realizes the functions performed by the information reception means 32 and the information recording means 33, and the information processing means 1 provides export function to the recording medium 31.

Next, a detailed example of the information storage format storage unit 22 in the present exemplary embodiment will be described. In order to access data, the information processing means 1 needs to know a storage location of the data it wants to access. In FIG. 1, data is stored in the information storage unit 6 or 7 (or in both).

The information access means 2 serves to answer to the information processing means 1 which information storage unit (6 or 7) it should access. More specifically, the information access means 2 returns a response to the information processing means 1 informing which information storage unit (6 or 7) stores the data (information) to be accessed by the information processing means, or which information storage unit the information processing means 1 should access when the data is stored in both of them. In the configuration in FIG. 1, the information processing means 1 accesses the information storing means 4 or 5, always via the information access means 2. However, in a case where the information processing means 1 already knows the storage location of the target data (for instance, when the data has been already specified), the information processing means 1 may directly access the information storing means 4 or 5. In this case, the information access means 2 lets an access request from the information processing means 1 through.

The information storage format storage unit 22 serves as a storage unit which is required when the information access means 2 fulfills the function of responding a storage location of the access target data to the information processing means 1. The information storage format storage unit 22 needs to hold at least the following two items of information.
(E) Information for identifying data;
(F) Information for identifying the storage location of the data.

As described above, examples of the information for identifying data are as follows, though not limited thereto.
(E1) File path of data;
(E2) File path of data and a host name (IP address) in which data is stored;
(E3) ID of data;
(E4) Hash value of data;
(E5) Meta-information of data; and
(E6) Keyword contained in data and occurrence word (for instance, "confidential document" and "storage," etc.)

Examples of the information for identifying the storage location of data are as follows, though not limited thereto.
(F1) Name of a host where data is stored, and IP address (for instance, host name: host1, IP address: 192.168.0.1, etc.)
(F2) Name of a virtual volume where data is stored (for instance, //shared/vol1).
(F3) Database name, table name, unique record ID where data is stored (for instance, database name: metadatabase, table name: hosttablem, unique record ID: 123).
(F4) File name and path name where data is stored (for instance, /home/data/123.obj, host1, /home/data/123.obj, etc.)
(F5) Data ID and hash value (for instance, data ID: 123, hash value: 5a579238e591f8b95569613f8cdc5b26).
(F6) data format (for instance, database format, plane file, sorted file).

As a method for storing these items of information, a method using a database or a method using a search engine may be employed.

In the present exemplary embodiment, an example of a method using a database will be described, though not limited thereto.

FIGS. 8, 9, and 10 are diagrams showing configuration examples of tables in a case where a database is used as the information storage format storage unit 22 shown in FIG. 1.

FIG. 8 is a diagram showing an example of a table when the storage location of data is searched from an ID (id) for identifying data. In the example shown in FIG. 8, it is presupposed that a configuration in which an index is created based on id of data. In other words, the storage location information (record) of data constituted by a host name, file path information, and a format (file or database) is stored in association with id of data in the database.

As long as id of data which is going to be accessed is known, the access destination identifying means 21 is able to obtain the storage location of data by using the table shown in FIG. 8 and obtaining the record thereof.

In this example, the storage location of data having data id "1" is "/home/data/1.obj" of "host1," and the data is stored as a normal file. In this case, a software operating on a server of host1 such as a file system an example of the information storing means 4, and a recording medium (such as a hard disk (HDD) where "/home/data/1.obj" is stored) is an example of the information storage unit 6.

As in the example of data id "1" in a case where the file path "/home/data/1.obj" can be automatically calculated from data id "1," this information is not always necessary.

"Host name" is not required when a host which is the storage location is automatically determined from data id using a technique such as a consistent hashing method. "Format" is not required either when it does not have to be known until the information storing means 4 is actually accessed.

When only the information shown in FIG. 8 exists in the information storage format storage unit 22, the information processing means 1 access the storage location of data, using id of data.

FIGS. 9 and 10 are diagrams showing configuration examples of tables when data is accessed using information other than data id. In the example shown in FIG. 9, as information for identifying data, meta-information (the creation date of data) and information identifying the storage location of data (id) are stored in association with each other.

When the information storage format storage unit 22 comprises the table shown in FIG. 9, the creation date of data is provided as meta-information. Using this meta-information, a system identifying and accessing data can be realized.

For instance, when one wants to access data created on Oct. 1, 2008, he needs to access data having data ids "1," "3," and "5."

The storage locations of the data having data ids "1," "3," and "5" can be obtained by using the table in FIG. 8. When the storage location of data can be known from data id, it is not necessary to search the table in FIG. 8. The column data in the three rightmost columns in the table in FIG. 8 may be listed in the table in FIG. 9 instead of the ids. In other words, the table may be configured so that, as the information for identifying data, the storage location information (record) of data constituted by the meta-information (the creation date of data), the host name and file path information, and the format (file or database) are stored associated with each other.

FIG. 10 is a diagram showing an example of a table configuration of the information storage format storage unit 22 required when the actual storage location of data is obtained from a file path from the information processing means 1. File name as information for identifying data and data id as information for identifying the storage location of data are stored associated with other.

For instance, when the information processing means 1 makes a request to access a file named
/home/hoge/testdata.dat,
the access destination identifying means 21 needs to access data having data id "1" using the table (FIG. 10) of the information storage format storage unit 22.

By using the table in FIG. 8, it becomes clear that the file named
/home/hoge/testdata.dat
is "/home/data/1.obj" of "host1" having data id "1."

As in the table examples shown in FIGS. 9 and 10, by combining (associating) and holding the information one wants to use when identifying data and the information identifying the storage location of data in the information storage format storage unit 22, a system in which data can be accessed in a flexible format can be constructed.

For instance, when one wants to access data with other meta-information such as the author of data, a table associating a combination of the author of data and data id should be held in the information storage format storage unit 22.

As in the inverted index of a search engine, by holding word information included in data as the information for identifying data, and recording data id including the word as the information identifying the storage location of data, one can access data by the contents of data as a search engine.

Figure 3:
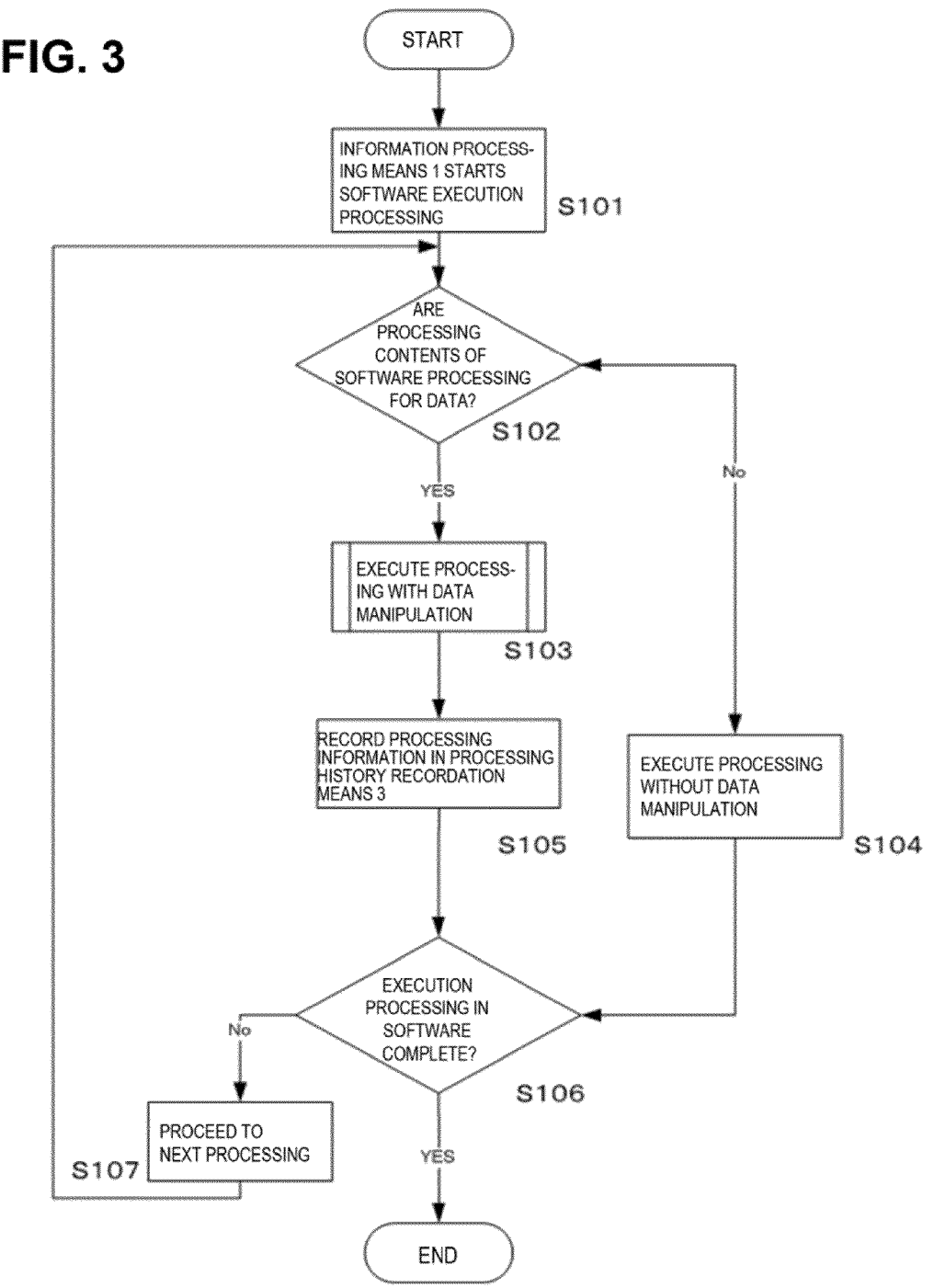
FIG. 3 is a flowchart showing an operation of the first exemplary embodiment of the present invention.

FIG. 3 is a flowchart showing a procedure for storing processing performed using information stored in the information storage units 6 and 7 or the processing results in the information storage units 6 and 7 in the information processing system of the present exemplary embodiment. Next, with reference to FIGS. 1 and 3, the overall operation of the present example will be described in detail.

First, the information processing means 1 reads an execution binary or source code of software operated on the information processing system, and starts software execution processing (step S101 in FIG. 3). This execution binary or source code may be held by the information processing means 1 comprising storage means, may be read from any of the recording units of the present exemplary embodiment, or may be received from a system or user outside the present exemplary embodiment.

Next, the information processing means 1 confirms if the processing in the software is processing for data (information) (step S102). If the processing is not for data (processing without data manipulation), this processing (without data manipulation) is executed (step S104) and the operation proceeds to step S106.

If the processing is for data, the information processing means 1 executes this processing with data manipulation (step S103) and records information identifying the contents of the processing on data and the target data in the processing history recording means 3 (step S105).

It is noted that the information processing means 1 may switch the execution order of the steps S103 and S105, or may simultaneously execute the steps S103 and S105 in parallel. Since it is not necessary to guarantee that the processing history is perfectly recorded in the step S105, the information processing means 1 may proceed to the next processing (the step S106) without waiting for the completion of the step S105 after the step S103.

In the step S106, the information processing means 1 confirms whether or not the software has completed the execution processing. When it is complete, the operation ends. When it is not, the operation proceeds to next processing (step S107), and the information processing means 1 confirms if the contents of the next processing are for data (the step S102). As described, the processing steps inside the execution software are repeated.

In the flowchart in FIG. 3, "processing" may treat the following as a unit of processing.

Execution instruction for a computer such as a machine language instruction,

Function including a system call or the like,

Function defined in a source code

Any range (block) in a source code

Any number of sentences in a source code

When the information processing means 1 confirms whether or not the processing in the software is processing for data in the step S102, the following methods may be used, instead of analyzing an execution instruction or source code.

The source code writer adds a predetermined annotation in a source code,

A predetermined function is automatically treated as data processing (when the predetermined function is detected, data processing is recognized), and The processing of a predetermined function name is treated as data processing.

By employing the above methods, it becomes easy to recognize whether the processing is processing for data or not, increasing the speed of the processing.

In FIG. 3, the procedure is such that judgment and recording are performed at the time of execution. However, the following procedure may be taken at the time of compiling.

First, the information processing means 1 reads a source code and extracts a part of the processing on data during the analysis of the source code (such as Lexical Analysis Phase) at the time of compiling.

Then the compiler executed by the information processing means 1 generates an executable code of a record instruction for the processing history recording means 3 when an execution instruction (binary format) is generated.

Employing the above described procedure eliminates the necessity for the information processing means 1 to perform the check processing (the step S102) shown in FIG. 3, when the compiled and linked software (execution module) is executed, and the information processing means 1 should simply run the execution binary of the program as a normal execution base. As a result, high-speed operation can be achieved.

Instead of generating the execution instruction by compiler processing, this may be realized by inputting a source code and outputting the source code to which processing for recording to the processing history recording means 3 is added as a pre-compiler which performs lexical analysis of the source code. In this case, since there is no need to perform the check processing shown in the flowchart in FIG. 2, high-speed operation can be achieved. Any other compiler can be utilized for compiling.

Figure 4:
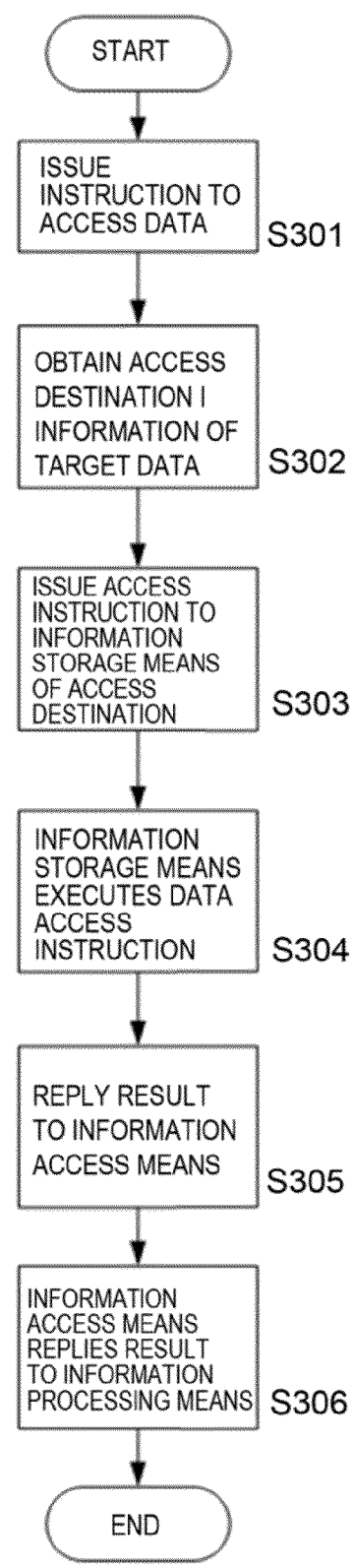
FIG. 4 is a flowchart showing a flow of the first exemplary embodiment of the present invention.

FIG. 4 is a flowchart showing the procedure of the step S103 in the flowchart in FIG. 3. With reference to FIGS. 1 and 4, the operation of the processing with data manipulation in the step S103 in the flowchart in FIG. 3 will be described.

First, the information processing means 1 issues an access instruction to the information access means 2 (step S301 in FIG. 4). In the step S301, the information access transmission/reception means 20 in the information access means 2 receives the access instruction.

Next, the access destination identifying means 21 in the information access means 2 obtains information that can identify the storage location of the processing target data (storage means) from the information stored in the information storage format storage unit 22 (step S302). If data already exists in any of the information storage location (storage means), a data read operation can be performed as described above.

In a case of new data write processing (for instance, a new file is created and data is written thereto), when there is no written data in any of the information storage location (storage means), the access destination identifying means 21 determines the information storage location of the new file and exports the storage location information to the information storage format storage unit 22.

When a new file is created and data is written thereto, for instance, information indicating that a new file name (file path) is saved in the information storing means 4 should be recorded in the information storage format storage unit 22 in any format. For instance, the format can be file name as a key, and a hash table having the storage location information (information identifying where the file is held such as the IP address of a computer of the information storing means 4) as a value thereof.

After the access destination of the processing target data is specified in the step S302, an information access instruction is issued to the information storing means of the access destination (step S303).

Next, the information storing means 4 or 5 of the access destination executes the access instruction on the designated data (step S304).

Then the information storing means 4 or 5 of the access destination replies the result of the access to the processing target data to the information access means 2 (step S305).

Finally, the information access means 2 replies the received result to the information processing means 1 (step S306).

In the step S305, the information storing means 4 or 5 of the access destination may reply the result directly to the information processing means 1 without replying it to the information access means 2. Since the step S306 is unnecessary in this case, the performance (access time) will improve.

When information is updated in the step S304, the information access means 2 (or any other means) updates the information for the information storage format storage unit 22 if necessary.

Figure 5:
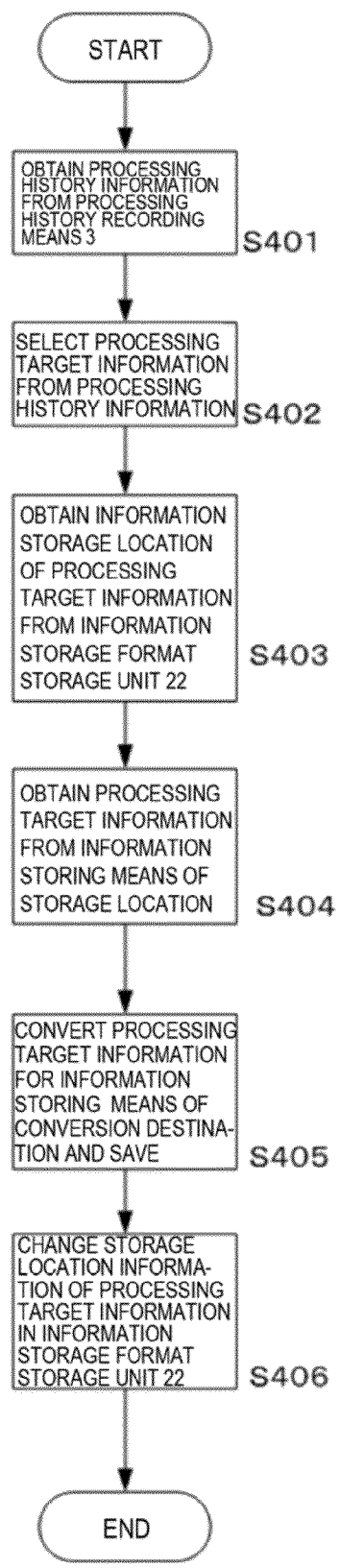
FIG. 5 is a flowchart showing an operation of the first exemplary embodiment of the present invention.
Figure 6:
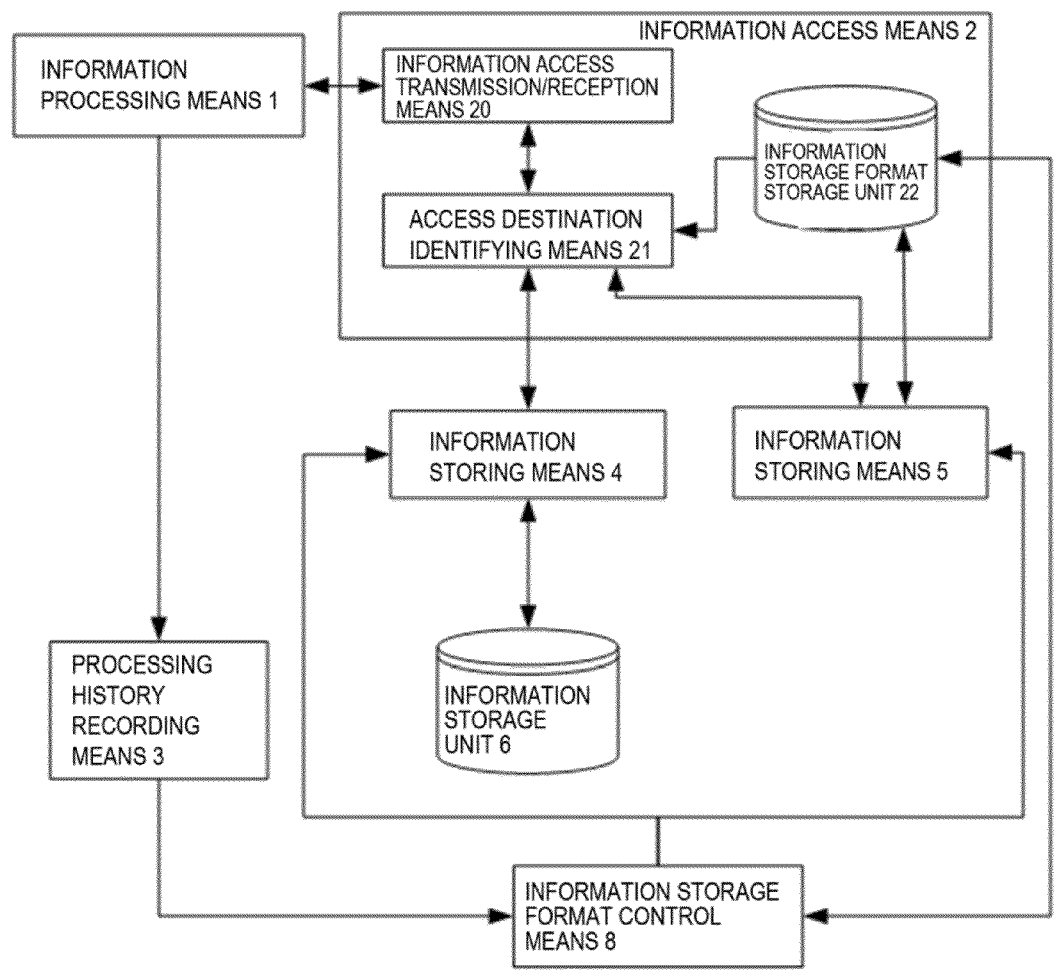
FIG. 6 is a diagram illustrating the configuration of a second exemplary embodiment of the present invention.

FIG. 5 is a flowchart showing a procedure for changing an information storage format performed by the information storage format control means 8. With reference to FIG. 1 and the flowchart in FIG. 5, processing for changing an information storage format performed by the information storage format control means 8 will be described.

The information storage format control means 8 starts the processing for converting an information storage format, triggered by any occasion. Then, at the beginning of the converting processing, the information storage format control means 8 obtains processing history information from the processing history recording means 3 (step S401 in FIG. 5).

Next, the information storage format control means 8 selects the processing target information from the processing history information of the processing history recording means 3 (step S402). In a case where the processing target information is already determined when the conversion processing is started, the processing in the step S402 is unnecessary and the processing history information relating to the processing target information should be obtained in the step S401.

Next, the information storage location (data storage location) of the processing target information (data) is obtained from the information storage format storage unit 22 (step S403).

Next, the processing target information (data) is obtained from the information storing means of the data storage location (step S404).

Then, the processing target information (data) is modified for the information storing means of the conversion destination and stored (step S405).

Finally, the data storage location information of the processing target information (data) stored in the information storage format storage unit 22 is updated (step S406).

Next, an occasion triggering the information storage format control means 8 to perform the processing for changing an information storage format shown in the flowchart in FIG. 5 will be described. In the present embodiment, the following occasion may trigger the processing for changing an information storage format.

(G1) The processing is performed following the execution flowchart shown in FIG. 5, when the processing history information stored in the processing history recording means 3 exceeds a condition.

(G2) The processing is performed following the execution flowchart shown in FIG. 5 at a predetermined time interval (regularly).

First, the case (G1) where "the processing history information stored in the processing history recording means 3 exceeds a condition" will be explained.

In this case, the processing for changing an information storage format is started when the processing information is recorded in the step S105 in the flowchart shown in FIG. 3, the history of the processing target information stored in the processing history recording means 3 is confirmed, and a condition (referred to as "information storage format changing condition" hereinafter) is met.

Here, let us assume that a condition that "if information stored in the information storing means 4 is read three times or more by the information processing means 1, the information storing means of this information is changed to the information storing means 5" is predetermined as the information storage format changing condition. This condition is held by the information storage format control means 8, or by means for notifying the information storage format control means 8 (for instance, software that manages the processing history recording means 3) according to the information changes in the processing history recording means 3.

When history information indicating that the information storage format changing condition (here, read processing of information three times or more by the information processing means 1 reads information is the information storage format changing condition) has been met is stored in the processing history recording means 3, the information storage format control means 8 changes the information storage format of this information. At this time, it is necessary to confirm that this information is stored by the information storing means 4 with this condition. This can be confirmed by accessing the information storage format storage unit 22, or by recording information indicating that the information is stored by the information storing means 4 as the processing history information of the processing history recording means 3.

At this time, the storage means of this information is changed from the information storing means 4 to the information storing means 5 in the operation flow of the information storage format control means 8. Since the steps S401 to S403 in FIG. 5 have been completed at this point of time, the information storage format control means 8 should simply execute the procedures in the steps S404 to S406.

Next, the case (G2) where the information storage format control means 8 performs the changing processing following the execution flowchart shown in FIG. 5 at a predetermined time interval will be described. The information storage format control means 8 executes the changing processing (refer to the flowchart in FIG. 5) at a certain time interval.

First, whether or not information stored in the processing history recording means 3 satisfies the information storage format changing condition is confirmed. More specifically, for instance, a database (refer to FIG. 7), with which the processing history recording means 3 stores the processing history, is accessed (the step S401 in FIG. 5), information stored in the database is selected (the step S402), and the information storage location of the selected information is obtained (the step S403).

If the information satisfies the information storage format changing condition, the information storage format control means 8 executes the processing of the steps S404 to S406 in FIG. 5. If the information storage format changing condition is not met, the information storage format control means 8 selects a different item of information in the step 402, and obtains the information storage location of the target information (the step S403).

Then, the information storage format control means 8 makes a judgment regarding the information storage format changing condition again. The process is repeated as described, and the information storage format control means 8 performs the changing processing while determining whether or not information in the processing history information meets the information storage format changing condition.

As the information storage format changing condition, information such as the capacity of an information storage unit such as the information storage units 6 and 7 may be used.

Alternatively, the information storing means may be switched for information according to the access method of the information processing means 1. The access destination identifying means 21 realizes this switching processing. For instance, the information storing means 5 performs an operation similar to a read operation, and the information storing means 4 performs an operation similar to a write operation. Then, when any number of write operations, as the information storage format changing condition, are performed on the information storing means 4, the contents of information stored in the information storing means 4 are transferred to the information storing means 5.

As described above, by having the information storing means 5 store information in a format suitable for read operations and having the information storing means 4 store information in a format suitable for write operations, an information storage system maintaining high write performance and high-speed read performance, while not the latest, can be realized.

The entire information of information may be stored in the information storing means 4, and only some parts of this information and certain types of meta-information may be stored in the information storing means 5.

The system may operate in such a manner that the information processing means 1 stores information to both the information storing means 4 and 5, when making access to the information similar to a write operation, or when the information processing means 1 executes information access, a write operation is performed on the information storing means 4, and the information storage processing to the information storing means 5 is performed by the information changing processing of the information storage format control means 8. As a result, the information access processing by the information processing means 1 can be completed by storing information in the information storing means 4 regardless of the performance quality of the information storage processing on the information storing means 5.

Next, the processing of the information storage format control means 8 will be described. The information storage format control means 8 converts an information storage format using the log information stored in the processing history recording means 3. The contents shown in FIG. 7 are recorded as the log information.

Following describes a case of conversion processing where, as a conversion rule, there is a rule that a plane file is converted into a sorted file when sort processing occurs three times or more.

Here, an example of a plane file is a file in which "values are stored in a predetermined format."

An example of a sorted file is a file in which "a first array is stored in a format in which it is sorted."

First, the processing history recording means 3 identifies data on which sort processing has occurred three times or more.

By searching data (data conforming to the processing rule) on which sort processing has occurred three times or more using the table in FIG. 7, the data having id; 3 is obtained as data conforming to the rule (the steps S401 and S402 in FIG. 5).

The table in FIG. 8 indicates the storage location of the data having id "3" and the current format thereof, plane file (the step S403 in FIG. 5).

Since the conversion rule states that a plane file conforming to the rule needs to be converted into a sort file, the "3.obj" file is read from "host3," converted into a sort file, and is saved in "host3" (the steps S404 and S405 in FIG. 5). (An instruction may be issued to "host3" to perform such processing.) Then, the format record for the data having id "3" in FIG. 8 is changed (the step S406 in FIG. 5).

By performing the conversion described above, data on which sort processing is performed frequently is converted into a format, in which the data is sorted in advance, and held. Because of this, when sort processing is performed thereafter, the actual sort processing does not have to be performed and it suffices that data can simply be read. As a result, the performance and efficiency of the system will improve. Since the conversion is performed according to the operation of the system, even if the access status on data is unknown, an adaptive system which performs the conversion at the point of time when the number of sort access instances increases, can be provided.

<Exemplary Embodiment 2>

Next, a second exemplary embodiment of the present invention will be described. FIG. 5 is a diagram illustrating the configuration of the second exemplary embodiment of the present invention. In this configuration, the information storage unit 6, the information recordation destination of the information storing means 5 in the previous example, is equal to the information storage format storage unit 22. The present exemplary embodiment operates identically to the first exemplary embodiment.

The present exemplary embodiment may operate in such a manner that the information storing means 5 updates the information storage format storage unit 22 instead of the access destination identifying means 21. Information may be always stored in the information storing means 4, and the information storage format storage unit 22 may be updated by the information storage format control means 8. As a result, the speed of processing accompanied by update of information stored in the information storage format storage unit 22 will increase since the update processing is completed by the updating by the information storing means 4.

The present invention is suitable for application to an information processing system and information storage system.

Each disclosure of Patent Document and Non-Patent Document is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

The present invention and the exemplary embodiments are summarized below as Supplementary notes.

(Supplementary Note 1)

An information processing system comprising:

an information storing means that is capable of supporting a plurality of mutually different information storage formats and stores data in an information storage format corresponding to the data;

a processing history recording means that records the history of information processing on data; and an information storage format control means that controls the information storage format of the data based on processing history information recorded in the processing history recording means.

(Supplementary Note 2)

The information processing system according to Supplementary note 1, comprising an information processing means that performs preset processing on the data held by the information storing means and stores the processing history of processing performed on the data in the processing history recording means.

(Supplementary Note 3)

The information processing system according to Supplementary note 2, including an information access means that identifies information storing means which corresponds to access target data when the information processing means accesses the data, and that assigns the access request from the information processing means to the identified information storing means.

(Supplementary Note 4)

The information processing system according to Supplementary note 3, wherein the information access means includes:

an information storage format storage unit that holds the data and information associated with the data, the information identifying the information storage format of the data.

(Supplementary Note 5)

The information processing system according to any one of Supplementary notes 1 to 4, wherein the information storage format control means holds a condition for changing the information storage format of the data;

judges a condition for changing the information storage format based on the processing history information of the processing history recording means; and changes the information storage format of the data based on the judgment result.

(Supplementary Note 6)

The information processing system according to Supplementary note 2, wherein the information processing means detects processing on the data and stores the history information of the processing performed on the data in the processing history recording means.

(Supplementary Note 7)

The information processing system according to Supplementary note 6, wherein the information processing means detects processing on the data, during the execution of the processing.

(Supplementary Note 8)

The information processing system according to Supplementary note 6, wherein the information processing means comprises a means that converts a program source code describing processing into an execution instruction group, and generates an instruction for executing processing on the data and an instruction for storing the history information of the processing performed on the data in the processing history recording means.

(Supplementary Note 9)

The information processing system according to Supplementary note 6, comprising a means that appends a program code for storing the processing history information in the processing history recording means to a program executed by the information processing means.

(Supplementary Note 10)

The information processing system according to Supplementary note 1 or 4, wherein at least one of the plurality of information storage formats realized by the information storing means includes the information storage format storage unit.

(Supplementary Note 11)

The information processing system according to Supplementary note 5, wherein the information storing means includes a plurality of information storage media each associated with one of a plurality of mutually different information storage formats.

(Supplementary Note 12)

The information processing system according to Supplementary note 11, wherein the information storage format control means uses the capacity of an information recording medium as a condition for changing the information storage format of the data.

(Supplementary Note 13)

The information processing system according to Supplementary note 3, wherein the information access means selects the information storing means according to the type of access to data.

(Supplementary Note 14)

An information processing method, comprising:

an information storing means capable of supporting a plurality of mutually different information storage formats, storing data in an information storage format corresponding to the data;

recording the history of information processing on data in processing history recording means; and changing the information storage format of data based on processing history information recorded in the processing history recording means.

(Supplementary Note 15)

The information processing method according to Supplementary note 14, comprising performing preset processing on the data held by the information storing means; and recording the history of processing performed on the data in the processing history recording means.

(Supplementary Note 16)

The information processing method according to Supplementary note 15, comprising identifying information storing means corresponding to access target data when accessing the data, and assigning the access request to the specified information storing means.

(Supplementary Note 17)

The information processing method according to Supplementary note 16, comprising associating and holding data and information which identifies the information storage format of the data.

(Supplementary Note 18)

The information processing method according to any one of Supplementary notes 14 to 17, comprising holding a condition for changing the information storage format of the data; the method judging a condition for changing the information storage format based on the processing history information stored in the processing history recording means; and changing the information storage format of the data based on the judgment result.

(Supplementary Note 19)

The information processing method according to Supplementary note 15, comprising detecting information processing on the data and storing the history information of the processing performed on the data in the processing history recording means.

(Supplementary Note 20)

The information processing method according to Supplementary note 19, comprising detecting information processing on the data during the execution of the processing.

(Supplementary Note 21)

The information processing method according to Supplementary note 19, comprising:

converting a program source code describing information processing on the data into an execution instruction group, and generating an instruction for executing the information processing on the data and an instruction for storing the processing history information in the processing history recording means.

(Supplementary Note 22)

The information processing method according to Supplementary note 19, comprising:

giving a program code for storing the processing history information in the processing history recording means to a program to be executed.

(Supplementary Note 23)

The information processing method according to Supplementary note 14 or 17, wherein at least one of the plurality of information storage formats realized by the information storing means includes the information storage format storage unit.

(Supplementary Note 24)

The information processing method according to Supplementary note 18, wherein the information storing means realizing the plurality of information storage formats includes a plurality of information storage media, each associated with one of a plurality of mutually different information storage formats.

(Supplementary Note 25)

The information processing method according to Supplementary note 21, comprising:

using a capacity of an information recording medium as a condition for changing the information storage format of the data when controlling the information storage format.

(Supplementary Note 26)

The information processing method according to Supplementary note 25, comprising :

selecting information storing means for storing the data according to the type of access to the data.

(Supplementary Note 27)

A program (or a computer-readable recording medium storing the program), causing a computer to execute the processing comprising:

an information storing means capable of supporting a plurality of mutually different information storage formats, store data in an information storage format corresponding to the data;

recording the history of information processing on data in processing history recording means; and changing the information storage format of the data based on the processing history information recorded in the processing history recording means.

(Supplementary Note 28)

The program (or a computer-readable recording medium storing the program) according to Supplementary note 27, causing the computer to execute a process of performing preset processing on the data held by the information storing means, and a process of storing the log information of processing performed on the data in the processing history recording means.

(Supplementary Note 29)

The program (or a computer-readable recording medium storing the program) according to Supplementary note 28, causing the computer to execute a process of identifying information storing means corresponding to access target data when accessing the data and of assigning the access request to the specified information storing means.

(Supplementary Note 30)

The program (or a computer-readable recording medium storing the program) according to Supplementary note 29, causing the computer to execute the processing comprising associating and holding the data and information identifying the information storage format of the data in an information storage format storage unit.

(Supplementary Note 31)

The program (or a computer-readable recording medium storing the program) according to any one of Supplementary notes 27 to 30, causing the computer to execute the processing comprising:

holding a condition for changing the information storage format of the data;

judging a condition for changing the information storage format based on the processing history data stored in the processing history recording means; and changing the information storage format of the data based on the judgment result.

(Supplementary Note 32)

The program (or a computer-readable recording medium storing the program) according to Supplementary note 28, causing the computer to execute the processing comprising detecting processing on the data and storing the history information of the processing performed on the data in the processing history recording means.

(Supplementary Note 33)

The program (or a computer-readable recording medium storing the program) according to Supplementary note 32, causing the computer to execute the processing comprising detecting processing on the data during the execution of the processing.

(Supplementary Note 34)

The program (or a computer-readable recording medium storing the program) according to Supplementary note 32 causing the computer to execute the processing comprising:

converting a program source code into an execution instruction group, and a process of generating an instruction for executing processing on the data and an instruction for storing the, processing history information in the processing history recording means.

(Supplementary Note 35)

The program (or a computer-readable recording medium storing the program) according to Supplementary note 32, causing the computer to execute the processing comprising giving a program code for storing the processing history information in the processing history recording means to a program to be executed.

(Supplementary Note 36)

The program (or a computer-readable recording medium storing the program) according to Supplementary note 29, wherein at least one of a plurality of information storage formats realized by the information storing means includes the information storage format storage unit.

(Supplementary Note 37)

The program (or a computer-readable recording medium storing the program) according to Supplementary note 31, wherein the information storing means realizing the plurality of information storage formats comprises a plurality of information storage media each associated with one of a plurality of mutually different information storage formats.

(Supplementary Note 38)

The program (or a computer-readable recording medium storing the program) according to Supplementary note 37, comprising using a capacity of an information recording medium as a condition for changing the information storage format of the data.

(Supplementary Note 39)

The program (or a computer-readable recording medium storing the program) according to Supplementary note 29, comprising selecting the information storing means according to the type of access to the data.

The invention claimed is:

1. An information processing system comprising:
   one or a plurality of information storage units;
   one or a plurality of information storing means capable of supporting a plurality of mutually different information storage formats, said information storing means storing data in an information storage format corresponding to said data in associated one of said one or a plurality of information storage units;
   a processing history recording means that records a history of information processing performed by an information processing means on data which is held in said information storage unit; and
   an information storage format control means that controls to change said information storage format corresponding to said data stored in said information storing means, based on said history of information processing on the data recorded in said processing history recording means.

2. The information processing system according to claim 1, comprising
   said information processing means that performs preset information processing on said data which is held in said information storage unit, and that stores a history of said information processing performed on said data in said processing history recording means.

3. The information processing system according to claim 2, comprising
   an information access means that identifies said information storing means corresponding to access target data, when said information processing means accesses said data stored in said information storing means, and that assigns a request of said access from said information processing means to said identified information storing means.

4. The information processing system according to claim 3, wherein said information access means includes
   an information storage format storage unit that holds information that identifies an information storage format of data in association with said data stored in said information storing means.

5. The information processing system according to claim 4, wherein said one or a plurality of information storage units includes said information storage format storage unit.

6. The information processing system according to claim 3, wherein said information access means selects said information storing means according to type of access to data.

7. The information processing system according to claim 2, wherein said information processing means detects information processing on said data stored in said information storing means and stores a history of said information processing performed on said data in said processing history recording means.

8. The information processing system according to claim 7, wherein said information processing means detects information processing on said data stored in said information storing means during execution of said information processing.

9. The information processing system according to claim 7, wherein said information processing means comprises
   a means that converts a program source code which describes processing into an execution instruction group, said means generating an instruction for executing information processing on said data stored in said information storing means and an instruction for storing history information of said information processing performed on said data recorded in said processing history recording means.

10. The information processing system according to claim 7, comprising
    a means that appends a program code for storing said history of information processing in said processing history recording means to a program executed by said information processing means.

11. The information processing system according to claim 1, wherein said information storage format control means holds a condition for changing said information storage format of said data stored in said information storing means,
    judges whether or not a condition for changing said information storage format based on the processing history information of said processing history recording means is met, and
    changes said information storage format corresponding to said data stored in said information storing means based on said judgment result.

12. The information processing system according to claim 11, wherein a plurality of said information storage units are associated with said plurality of mutually different information storage formats.

13. The information processing system according to claim 12, wherein said information storage format control means uses capacity of an information storage unit as a condition for changing an information storage format of said data stored in said information storing means.

14. The information processing system according to claim 1, comprising:
    an information access means that receives a request to access data from said information processing means, said information access means including:
    an access destination identifying means that identifies said information storage unit in which said access target data is recorded and issues an access request from said information processing means to said corresponding information storing means; and
    an information storage format storage unit that associates and holds first information for identifying data and second information for identifying a storage location of said data, wherein
    said information storage format storage unit of said information access means includes:
    a table that holds a data ID as said first information and a data storage location as said second information in association with said data ID; and
    a table that holds meta-information as said first information and a data ID as said second information, in association with said meta-information, or a table that holds word information included in the content of data as said first information, and said data ID as said second information in association with said word information, and wherein
    when changing an information storage format, said information storage format control means obtains a storage location of processing target data from said information storage format storage unit, and obtains processing target data from said information storage unit via said corresponding information storing means, and
    said information storage format control means transforms processing-target data for said information storing means of a conversion destination, stores a resulting data in said information storage unit via said information storing means, and updates a data storage location of said processing target data recorded in said information storage format storage unit.

15. An information processing method in an information processing system, comprising:
- storing data in an information storage format corresponding to said data, out of a plurality of mutually different information storage formats, in an associated one of one or a plurality of information storage units;
- recording a history of information processing on data in a processing history recording means; and
- changing said information storage format corresponding to said data stored in said information storing means, based on said history of information processing on said data recorded in said processing history recording means.

16. An information processing system that performs information processing on data, characterized in that said information processing system comprises:
- one or a plurality of information storage units;
- one or a plurality of information storing means, capable of supporting a plurality of mutually different information storage formats, said information storing means storing data in an information storage format corresponding to said data in associated one of said one or a plurality of information storage units;
- an information storage format control means that controls to change said information storage format corresponding to said data stored in said information storing means; and
- an information processing means that performs information processing on data held in said information storage unit; and
- an information access means that identifies said information storing means corresponding to access target data, when said information processing means accesses said data stored in said information storing means, and that assigns a request of said access from said information processing means to said identified information storing means, said information access means selecting said information storing means according to type of access to data.

* * * * *